Patented Dec. 14, 1943

2,336,468

UNITED STATES PATENT OFFICE 2,336,468

BITUMINOUS EMULSION AND PROCESS OF PREPARING SAME

Walter G. Cole, Baton Rouge, La., and Walter D. Buckley, Berkeley, Calif., assignors to American Bitumuls Company, San Francisco, Calif., a corporation of Delaware No Drawing. Application October 2, 1939, Serial No. 297,564

13 Claims. (Cl. 252—311.5)

This invention relates to the production of bituminous emulsions and more particularly to mixing type asphalt emulsions and to new methods of preparing the same and improving properties thereof.

The production of bituminous emulsions which have a satisfactory combination of properties represents a difficult and empirical problem. Such emulsion should contain a minimum of ingredients other than bitumen and water in order that the deposited film may consist essentially of the bitumen and be free of components which would exert an adverse effect on the film. Likewise, the deposited film and the emulsions should have surface tension characteristics such that the emulsion will wet and the film adhere to the base material being treated with the emulsion. To afford satisfactory handling, bituminous emulsions must be stable against coalescence and settlement in storage. The emulsion should have a relatively low viscosity, i. e., a liquid consistency or viscosity of less than about 100 sec. and preferably more than approximately 40 sec. Saybolt Furol at 77° F., and should be free from gelling tendencies. The stabilizer in the emulsion should be resistant to deterioration and loss of mixing properties in the presence of an aqueous alkaline phase. One problem of considerable importance is to obtain an emulsion having, in addition to the above-mentioned properties, a rapid dehydration or drying rate. All of the above listed properties in the completed emulsion are preferred, but it should be understood the invention in its broader aspect is not limited to such preferred emulsions, since for some purposes satisfactory results are obtained with emulsions deficient in one or more properties.

It has been discovered that bituminous emulsions having such desirable properties as those above-mentioned can be obtained by adopting an alkali emulsifier and a stabilizer containing glycinin. Certain process steps and critical conditions must be observed to obtain the desired results.

Accordingly, an object of the invention is to provide a new and useful process for producing bituminous emulsions.

Another object of the invention is to provide bituminous emulsions such as asphalt emulsions having new and useful properties.

An additional object of the invention comprises the production of bituminous emulsions characterized by stability against coalescence or settlement in storage and substantial freedom from gelling tendencies.

The production of an emulsion having good dehydration or drying properties and the ability to wet and coat hydrophilic aggregate with a tenacious adherent film of bitumen comprise additional objects of this invention.

Another object of the invention is to provide a stabilizer for bituminous emulsions which is readily dispersible in water alone and which is less sensitive to heat and denaturization in the presence of alkali than are various prior known stabilizers.

An additional purpose of the invention is to supply a liquid freely flowable bituminous emulsion of approximately 50–60% bitumen content stabilized with a glycinin-containing stabilizer.

Another object of the invention comprises the inhibition of the gelling tendencies of certain emulsions by a novel process.

To produce a bituminous emulsion, according to the principles of this invention, a material such as asphalt is dispersed in an aqueous solution containing certain critical proportions of an inorganic alkali and the emulsion stabilized with a glycinin-containing stabilizer. The invention is particularly effective for the stabilization of preformed quick setting asphalt emulsions having an alkaline aqueous phase. Preferably, the pre-formed quick setting emulsion is one in which the emulsifying agent consists essentially of an aqueous solution of alkali metal hydroxide and asphaltogenic acids present in asphalt, but soap emulsifiers are not precluded from the broader scope of the invention. In order that a satisfactorily stabilized emulsion may be produced, it is essential that the concentration of alkali therein be within certain critical limits. When sodium hydroxide (NaOH) is the alkaline material, approximately 0.12% to 0.18% and preferably approximately 0.15% by weight of the NaOH, based on the completed emulsion, should be utilized. When potassium hydroxide, for instance, (KOH) is the alkaline emulsifying agent, approximately 0.18% to 0.24% and preferably approximately 0.21% by weight of the KOH, based on the completed emulsion, is adopted. Equivalent quantities of other suitable inorganic strong alkalies, such as trisodium phosphate, may be substituted for the sodium or potassium hydroxide.

Stabilization is preferably effected with a glycinin-containing material after emulsification with the above-described critical proportions of alkali. The stabilizer may be dispersed directly into the emulsion but is preferably incorporated by first dispersing in water or alkaline water and adding the pre-formed dispersion to the preformed quick setting emulsion in the proportion necessary to give the desired stabilization effect.

Glycinin is a protein occurring in soya beans. The particular combination of ingredients occurring in soya bean flour or meal, preferably an edible grade, has been found to comprise a particularly useful stabilizer for the purposes of the present invention. Typical proportions of the ingredients in edible whole soya bean flour are as follows:

| | Per cent |
|---|---|
| Glycinin (with small amount of legumin, proteose and phaseolin) | 40.65 |
| Oil | 20.38 |
| Moisture | 7.65 |
| Galactan | 6.18 |
| Stachyose | 5.66 |
| Sucrose | 5.26 |
| Araban | 4.83 |
| Phosphatides | 3.08 |
| Cellulose | 1.63 |

Emulsions prepared as hereinabove described are highly satisfactory for many purposes. Nevertheless, in the coating of hydrophilic bases, as is often done in paving construction, difficulties have been encountered. More particularly, it has been found that such emulsions do not satisfactorily wet or coat hydrophilic aggregates or the deposited film adhere thereto with the tenacity desired. Emulsions prepared with the above critical proportions of alkali have an alkalinity substantially above pH 10.5 as determined with a glass electrode. It has been discovered than enhanced wetting and adherence of the deposited asphalt film on hydrophilic bases or aggregates is obtained by partial neutralization of the emulsion with weak solutions of acids such as acetic, boric, phosphoric acids, and adjustment of the pH preferably to from about 8.75 to 10.0.

Another problem which has been encountered with emulsions of some asphalts comprises the tendency of the emulsion to form a gel structure during storage. This results in a highly viscous or semi-solid mass which is still technically an emulsion but very difficult to handle. In those instances where such a gelling tendency is encountered, it has been discovered that addition of a small amount of an alkali metal borate, such as borax, inhibits the gelling tendency. The addition of borax in this manner may be utilized either with the high pH unneutralized emulsion or with emulsions which have pH adjusted as above described. The proportion of borax utilized is preferably from approximately 10% to 20% by weight of the dry soya bean flour stabilizer present in the emulsion. The alkali metal borate may be formed in situ by addition of boric acid to an alkaline emulsion. If necessary, additional borate may be added when a sufficient quantity cannot be formed in situ without inordinate reduction of alkalinity.

Additional ingredients which it is generally desirable to incorporate in the emulsion comprise a preservative to prevent decomposition by bacteria. A preferred preservative is formalin (40% solution of formaldehyde in water). Other preservatives are sodium arsenite, phenol, and the like. To prevent stratification of the dispersed bituminous emulsion phase either upwardly or downwardly through the aqueous phase because of difference in density, a small amount, e. g., 0.25–.75% of a colloidal clay such as bentonite may be incorporated in the aqueous phase of the emulsion.

Quick setting emulsions may be prepared for this invention by dispersing molten asphalt in hot alkaline water containing the previously disclosed proportions of an alkali metal hydroxide. An emulsion containing approximately 50–60% asphalt and about 50–40% alkaline water is preferred. Water temperatures may be maintained at 140° F. to 160° F., asphalt at 240° F. to 280° F. and the product at 200° F. to 210° F., to yield a satisfactory emulsion. These temperatures are not critical; for example, water temperature may be raised and the asphalt temperature lowered, to give the same resultant temperature in the product. The asphalt should be sufficiently hot to render it fluid in order that agitation and emulsification may be facilitated. This quick setting emulsion may be stabilized to a slow setting or mixing type emulsion by addition of a small amount of glycinin, e. g., approximately 1% of a glycinin-containing stabilizer such as the soya bean flour above disclosed. Borax, boric acid, bentonite and formalin or other preservatives may be added as previously described. The completed emulsion is preferably promptly cooled to atmospheric temperatures and the boric acid added preferably a substantial time after stabilization and manufacture is otherwise completed. For example, it has been found that 24 hours after manufacture the boric acid may be added to lower the pH to from about 8.75 to 10.0. Specific examples of proportions of ingredients which may be adopted are as follows:

*Example 1*

| | Per cent |
|---|---|
| Quick setting emulsion containing approximately 55% asphalt (200 to 300 Pen.) | 93.622 |
| Soya bean flour | 1.002 |
| Borax | 0.15 |
| Boric acid | .047 |
| Formalin | .281 |
| Water | 4.898 |

*Example 2*

| | Per cent |
|---|---|
| Quick setting emulsion containing 55% asphalt (85 to 100 Pen.) | 93.797 |
| Soya bean flour | 1.004 |
| Formalin | .281 |
| Borax | .151 |
| Water | 4.767 |

In the above examples the stabilizer is preferably first dispersed in plain water to form a 20% suspension and this suspension added to the emulsion to effect stabilization. This accounts for the small amount of water added to the basic emulsion. Alkaline water may be substituted for plain water to facilitate formation of the suspension of the stabilizer. It is important that a proper grade of soya bean flour or meal be utilized. It has been found that if the flour or meal has been heated or steamed too severely the glycinin, as well as perhaps other ingredients, are partially decomposed and that this product is undesirable for use in the present invention.

Emulsions prepared as above disclosed are stable against coalescence and settlement in storage, free from gelling tendencies and the stabilizer is resistant to deterioration and loss of mixing properties in the presence of the alkaline aqueous phase. The emulsion contains a minimum of ingredients other than bitumen and the film deposited therefrom contains no components which have a substantial adverse effect thereon. The emulsion is relatively free from gelling tendencies and has a rapid dehydration or drying rate when a stabilizer which yields a low viscosity emulsion is utilized as hereinafter disclosed. The quantity of boric acid given lowers the pH to within the range from approximately 8.75 to approximately 10.0 and thereby produces an emulsion having the ability to wet and coat hydrophilic aggregates with a tenacious adhering film of the deposited bitumen. The viscosity of these emulsions is relatively low, e. g., 50–60 sec. Saybolt Furol at 77° F., and the emulsion is a liquid free flowing product.

Another feature of the invention involves the control of viscosity of the stabilized emulsion. In certain applications of a stabilized emulsion a liquid but relatively viscous product may be advantageous, as where it is desired to form a surface film without undue penetration of the base material. Such viscous but liquid emulsions may be obtained by grinding soya beans, extracting oil from the same with a suitable solvent such as benzene to give a substantially oil-free product and using the extracted pulverized bean as a stabilizing agent. It is not understood why solvent extraction of the bean increases viscosity of the emulsion. Addition of the extracted oil back to the emulsion does not destroy the increased viscosity. This seems strange in view of the fact that a relatively low viscosity emulsion may be produced by utilizing untreated ground soya beans as a stabilizer or a meal or flour from soya beans which has been compressed mechanically to remove the oil therefrom. In the following examples A, B and C comprise liquid but highly viscous emulsions produced with solvent extracted soya bean meal and example D a low viscosity emulsion prepared with ground untreated soya beans as above-described.

|  | A | B | C | D |
|---|---|---|---|---|
| Extracted soya bean meal, per cent | 1.00 | 0.90 | 0.80 | ¹1.0 |
| Soya bean oil, do | 0 | ²0.10 | ²0.20 | 0 |
| Per cent asphalt, do | 56.8 | 56.6 | 56.8 | 56.4 |
| Viscosity 77° F | 101.8 | 104.7 | 96.5 | 68.1 |
| Cement test | 0 | 0 | 0 | 0 |
| pH ³ | 11.95 | 12.0 | 11.8 | 11.95 |
| Settlement (5 days): |  |  |  |  |
| Top | 57.0 | 57.2 | 57.1 | 57.0 |
| Bottom | 57.1 | 57.2 | 57.4 | 57.0 |
| Difference | 0.1 | 0 | 0.3 | 0 |

¹ Ground soya beans without any treatment.
² Not present in meal but added to emulsion.
³ Beckman glass electrode readings corrected for sodium error.

A troublesome factor which is encountered in the manufacture of bituminous emulsions comprises those asphalts which do not form satisfactory emulsions with water containing an alkali metal hydroxide alone. In general, it has been discovered that asphalts which are emulsifiable with caustic soda alone and which form satisfactory quick setting emulsions contain from approximately 1% to 1½% of asphaltic acids having an average molecular weight of from approximately 400 to 1200 and preferably from approximately 400 to 900. Conversely, asphalts which contain less than approximately 1% of such acids are not emulsifiable with water containing alkali metal hydroxides alone and it is those asphalts which are on the borderline of emulsibility which cause considerable difficulty and to which this invention is also applicable.

It has been discovered that by maintaining the concentration of alkali in the aqueous phase within the critical limits herein previously disclosed and by subjecting the asphalt to powerful shearing forces in the presence of such an alkaline solution, it is possible to form a fine dispersion of the asphalt. Such dispersions are, however, exceedingly unstable and coalesce promptly unless immediately stabilized by the process of this invention. Such stabilization may be effected by the immediate incorporation of a glycinin-containing stabilizer such as soya bean flour or meal above disclosed. It has also been found that formation of the initially fine but unstable dispersion of asphalt may be facilitated by the presence of small quantities of a saponified or saponifiable material, insufficient alone to effect stable emulsification, in the alkaline aqueous solution. The amount of saponifiable or saponified material thus added is very low and in the order of 0.10% to 0.25%. Liquid rosin oil and alkali metal soaps of liquid rosin oil comprise respectively suitable saponifiable and saponified materials. Other materials such as normally solid pine wood resins, for example a solvent extracted resin from pine wood like "Vinsol" and soaps thereof are suitable.

Asphalts which do not emulsify with water containing an alkali metal hydroxide alone to give a stable quick setting emulsion may be satisfactorily emulsified according to the above method in a colloid mill. The mill applies the powerful shearing forces previously referred to when molten asphalt and hot alkaline solution containing the critical proportions of sodium or potassium hydroxide are added thereto. A fine dispersion of the asphalt is initially formed and may be immediately passed to a second emulsifying zone where the unstable emulsion is immediately stabilized with glycinin-containing material before coalescence has occurred. Another method of effecting formation of a satisfactory emulsion is to apply the powerful shearing forces to the mixture of molten asphalt and alkaline aqueous solution in the colloid mill and stabilize the asphalt as emulsified in the mill by simultaneous incorporation of the glycinin-containing stabilizer. Likewise, the stabilizer may be added to the aqueous alkaline solution prior to admission to the colloid mill. When an auxiliary emulsifier such as the small quantity of liquid rosin oil or other saponifiable or saponified material is utilized to aid initial formation of a quick setting emulsion, the material may be introduced either into the colloid mill during emulsification or into the alkaline water prior to emulsification. Also, when the emulsion is manufactured by passing first through a colloid mill and then to a second stage emulsifier where the stabilizer is added, the saponifiable or saponified material may be incorporated either in the colloid mill or in the second stage emulsifier.

The following are examples of proportions utilized in the preparation of emulsions with a difficultly emulsifiable asphalt, i. e., one which does not emulsify satisfactorily with an alkali metal hydroxide in water alone.

*Example 3*

| | Per cent |
|---|---|
| Asphalt (85 to 100 Pen.) | 57.83 |
| Sodium hydroxide | .148 |
| Liquid rosin oil | .099 |
| Soya bean flour | .939 |
| Bentonite | .494 |
| Borax | .141 |
| Water | 40.053 |

After the emulsion had cooled, 0.296% formalin was added as a preservative. The borax also may be added after emulsification is completed. The asphalt in this case is known as Talco asphalt, which is obtained from a Mid-Continent crude.

*Example 4*

| | Per cent |
|---|---|
| Asphalt | 56.2 |
| Sodium carbonate | .05 |
| NaOH | .15 |
| Rosin oil | .10 |
| Bentonite | .50 |
| Soya bean flour | 1.00 |
| Borax | 0.15 |
| Formalin | 0.25 |
| Water | 41.6 |

These emulsions are stable against coalescence and settlement in storage, deposit a film of bitumen free of components which exert an adverse effect thereon, have a low viscosity of 40–100 sec. Saybolt Furol (77° F.), are free from gelling tendencies and loss of mixing properties during storage, and give a satisfactorily rapid dehydration or drying rate.

The proportion of stabilizer utilized in this invention is preferably in the order of 1%. Appreciable stabilizing effects are obtained with as little as 0.1%, and more than 2% is usually unjustified. Although pure glycinin may be adopted as a stabilizer, we prefer to utilize a suitable raw material containing the same. Soya bean flour or soya bean meal, provided it has not been heated to a temperature sufficient to decompose the glycinin, comprises a preferred species of stabilizer. The other ingredients occurring in the soya bean flour impart stabilizing and other properties which it is generally preferred to obtain. In general, it has been found desirable to use a comminuted soya bean in which the oil content is reduced to about 10% or less.

The term "glycinin" as used herein designates a stabilizing agent consisting essentially of glycinin as the principal bituminous emulsion stabilizing ingredient. The terms "Stabilizer," "stabilizing" or "stabilizing agent" designate stabilization of bituminous emulsions against breakdown by electrolyzing and the like.

Although the invention has been described in detail and numerous examples thereof given, it is to be understood that the invention is not to be limited thereby but is of the scope of the appended claims.

We claim:

1. In a process of coating a hydrophilic aggregate with bitumen, which comprises applying a bituminous emulsion thereto having an alkaline aqueous phase containing glycinin as a stabilizer, the step of enhancing the coating action of said emulsion on said hydrophilic aggregate by adjusting the alkalinity of said emulsion to a pH of from approximately 8.75 to approximately 10.0.

2. A bituminous emulsion which is liquid at ordinary atmospheric temperatures in the order of 77° F., comprising a continuous aqueous phase, a dispersed phase of bituminous material and glycinin as a stabilizer for the dispersed phase, said aqueous phase having a pH of from approximately 8.75 to approximately 10.0, whereby the coating action of said stabilized emulsion on hydrophilic aggregate is enhanced.

3. A bituminous emulsion which is liquid at ordinary atmospheric temperatures in the order of 77° F., comprising a continuous aqueous phase, a dispersed phase of bituminous material and comminuted soya bean as a stabilizer for the dispersed phase, said aqueous phase having a pH of from approximately 8.75 to approximately 10.0, whereby the coating action of said stabilized emulsion on hydrophilic aggregate is enhanced.

4. A process of forming a bituminous emulsion which is liquid at ordinary atmospheric temperatures in the order of 77° F., which comprises dispersing bitumen in an aqueous alkaline solution selected from the group consisting of from approximately 0.12% to 0.18% NaOH in water and 0.18% to 0.24% KOH in water, and stabilizing said emulsion with glycinin.

5. A process of forming a bituminous emulsion which is liquid at ordinary atmospheric temperatures in the order of 77° F., which comprises dispersing bitumen in an aqueous alkaline solution selected from the group consisting of from approximately 0.12% to 0.18% NaOH in water and 0.18% to 0.24% KOH in water, and stabilizing said emulsion with a small amount of comminuted soya bean.

6. A process of producing a bituminous liquid emulsion of an asphalt which does not emulsify satisfactorily with an alkali metal hydroxide in water alone, which comprises subjecting said asphalt and an aqueous alkaline solution selected from the group consisting of from approximately 0.12% to 0.18% NaOH in water and 0.18% to 0.24% KOH in water to powerful shearing forces sufficient to form a fine but unstable dispersion of the asphalt in said aqueous solution, and immediately stabilizing said dispersion with glycinin before substantial coalescence of the dispersed asphalt particles occurs.

7. A process as defined in claim 6, further characterized in that formation of said initial dispersion is facilitated with liquid rosin oil.

8. A process of preparing a bituminous liquid emulsion of an asphalt which does not emulsify satisfactorily with an alkali metal hydroxide in water alone, which comprises subjecting said asphalt and an aqueous alkaline solution selected from the group consisting of approximately 0.12% to 0.18% NaOH in water and 0.18% to 0.24% KOH in water to powerful shearing forces sufficient to form an unstable, fine dispersion of the asphalt in the aqueous phase which tends promptly to coalesce, immediately passing said fine dispersion to a second emulsifying zone, incorporating glycinin therein whereby coalescence of the dispersed asphalt is prevented and a stable emulsion formed, and inhibiting the tendency of said emulsion to gel in storage by incorporating a small amount of an alkali metal borate in said emulsion.

9. A process of forming a bituminous liquid emulsion, which comprises dispersing bitumen in an aqueous alkaline solution selected from the group consisting of from approximately 0.12% to 0.18% NaOH in water and 0.18% to 0.24% KOH in water, and simultaneously stabilizing and producing a relatively high viscosity not substantially greater than 170 seconds Saybolt at 77° F. by incorporating as a stabilizer a small amount of comminuted soya bean from which oil naturally occurring in soya beans has been removed by extraction with an organic solvent.

10. A process of forming a bituminous emulsion, which comprises dispersing bitumen in an aqueous alkaline solution selected from the group consisting of from approximately 0.12% to 0.18% NaOH in water and 0.18% to 0.24% KOH in water, and stabilizing said dispersion with a small amount of comminuted soya bean from which oil naturally occurring in soya beans has been mechanically expelled.

11. A process of producing a bituminous emulsion which comprises dispersing bitumen in an aqueous alkaline solution selected from the group consisting of from approximately 0.12% to 0.18% NaOH in water and 0.18% to 0.24% KOH in water, stabilizing said emulsion with glycinin and inhibiting the tendency of said stabilized emulsion to gel in storage by incorporating an alkali metal borate in said emulsion.

12. A process of producing a bituminous emulsion which comprises dispersing bitumen in an aqueous alkaline solution selected from the group consisting of from approximately 0.12% to 0.18% NaOH in water and 0.18% to 0.24% KOH in water, stabilizing said emulsion with comminuted soya bean and inhibiting the tendency of said stabilized emulsion to gel in storage by incorporating an alkali metal borate in said emulsion.

13. A process of preparing a bituminous emulsion which comprises dispersing bitumen in an aqueous alkaline phase selected from the group consisting of from approximately 0.12% to 0.18% NaOH in water and 0.18% to 0.24% KOH, facilitating said dispersion with from approximately 0.12% to 0.25% of rosin oil, and stabilizing said dispersion with comminuted soya bean.

WALTER G. COLE.
WALTER D. BUCKLEY.